United States Patent
Ota et al.

(10) Patent No.: US 11,522,218 B1
(45) Date of Patent: Dec. 6, 2022

(54) INORGANIC OXYCHLORIDE IONIC CONDUCTORS

(71) Applicant: Toyota Motor Engineering & Manufacturing North America, Inc., Plano, TX (US)

(72) Inventors: Shingo Ota, Ann Arbor, MI (US); Ryuta Sugiura, Ann Arbor, MI (US); Timothy S. Arthur, Ann Arbor, MI (US); Nikhilendra Singh, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/732,644

(22) Filed: Apr. 29, 2022

(51) Int. Cl.
   *C07C 17/15* (2006.01)
   *H01M 10/0562* (2010.01)
   *C01G 49/00* (2006.01)

(52) U.S. Cl.
   CPC ...... *H01M 10/0562* (2013.01); *C01G 49/009* (2013.01); *C01P 2002/52* (2013.01); *C01P 2002/72* (2013.01); *C01P 2002/88* (2013.01); *C01P 2006/32* (2013.01); *C01P 2006/40* (2013.01); *H01M 2300/008* (2013.01)

(58) Field of Classification Search
   CPC ........ H01M 10/0562; H01M 2300/008; C01G 49/009; C01P 2002/72
   See application file for complete search history.

(56) References Cited

U.S. PATENT DOCUMENTS

| | | | |
|---|---|---|---|
| 4,469,763 | A | 9/1984 | Walsh et al. |
| 4,668,593 | A | 5/1987 | Sammells |
| 5,753,388 | A | 5/1998 | Koksbang et al. |
| 2004/0058232 | A1 | 3/2004 | Kim et al. |
| 2009/0246561 | A1 | 10/2009 | Johnson et al. |
| 2020/0343580 | A1 | 10/2020 | Yushin et al. |

OTHER PUBLICATIONS

Preparation and intercalation chemistry of magnesium-iron(III) layered double hydroxides containing exhcangeable interlayer chloride and nitrate ions; Weiqing Meng, Feng Li, David G. Evans, Xue Duan; Materials Research bulletin 39 (2004) 1185-1193 (Year: 2004).*

Chen et al., "An All-Solid-State Rechargeable Chloride Ion Battery," Adv. Sci. vol. 6, issue 6, Mar. 20, 2019, pp. 1-12.

* cited by examiner

*Primary Examiner* — Sarah A. Slifka
*Assistant Examiner* — Rachel L Zhang
(74) *Attorney, Agent, or Firm* — Christopher G. Darrow; Darrow Mustafa PC

(57) ABSTRACT

An ionic conductor includes an inorganic oxychloride compound with a chemical composition of $(Fe_{1-x}M_x)O_{1-y}(OH)_yCl_{1-x}$ where M is selected from at least one of Mg and Ca, and x is greater than 0 and less than or equal to 0.25, y is greater than or equal to 0 and less than or equal to 0.25. The inorganic oxychloride compound has a thermal decomposition start temperature of about 410° C. and x-ray diffraction peaks (2θ) between about 20.79° and about 22.79°, between about 30.03° and about 32.03°, between about 39.47° and about 41.47°, and between about 76.44° and about 78.44°.

20 Claims, 3 Drawing Sheets

INORGANIC OXYCHLORIDE IONIC CONDUCTORS

CROSS-REFERENCE TO RELATED APPLICATIONS

The present application is related to U.S. patent application Ser. No. 17/732,782, filed Apr. 29, 2022, U.S. patent application Ser. No. 17/732,964, filed Apr. 29, 2022, U.S. patent application Ser. No. 17/732,736, filed Apr. 29, 2022, and U.S. patent application Ser. No. 17/732,758, filed Apr. 29, 2022, all of which are incorporated herein by reference in their entirety.

TECHNICAL FIELD

The present disclosure generally relates to ionic conductors, and particularly to inorganic ionic conductors.

BACKGROUND

Solid-state inorganic electrolytes provide many advantages in secondary battery design, including mechanical stability, no volatility, and ease of construction. However, $H_2S$ gas can be generated during decomposition of traditional sulfide solid-state inorganic electrolytes and traditional oxide solid-state inorganic electrolytes can have issues with formability due to hardness of the oxide.

The present disclosure addresses these issues with solid-state inorganic electrolytes, and other issues related to solid-state ionic conductors.

SUMMARY

In one form of the present disclosure, an ionic conductor includes an inorganic oxychloride compound with a chemical composition of $(Fe_{1-x}M_x)O_{1-y}(OH)_yCl_{1-x}$ where M is selected from at least one of Mg and Ca, and x is greater than 0 and less than or equal to 0.25, y is greater than or equal to 0 and less than or equal to 0.25. Also, x-ray diffraction peaks (2θ) of the inorganic oxychloride compound are present between about 20.79° and about 22.79°, between about 30.03° and about 32.03°, between about 39.47° and about 41.47°, and between about 76.44° and about 78.44°.

In another form of the present disclosure, an ionic conductor includes an inorganic oxychloride compound with a chemical composition of $(Fe_{1-x}M_x)O_{1-y}(OH)_yCl_{1-x}$ where M is selected from at least one of Mg and Ca, and x is greater than 0 and less than or equal to 0.25, y is greater than or equal to 0 and less than or equal to 0.25. Also, the inorganic oxychloride compound has a thermal decomposition start temperature of about 410° C. and x-ray diffraction peaks (2θ) between about 20.79° and about 22.79°, between about 30.03° and about 32.03°, between about 39.47° and about 41.47°, and between about 76.44° and about 78.44°.

In still another form of the present disclosure, a method of synthesizing an ionic conductor includes mixing together two or more chloride containing reagents, dissolving the mixed two or more chloride containing reagents in a liquid, and heating the liquid with the dissolved two or more chloride containing reagents such that an inorganic oxychloride compound precipitates and forms particles of $(Fe_{1-x}M_x)O_{1-y}(OH)_yCl_{1-x}$ where M is selected from at least one of Mg and Ca, and x is greater than 0 and less than or equal to 0.25, y is greater than or equal to 0 and less than or equal to 0.2. Also, x-ray diffraction peaks (2θ) of the $(Fe_{1-x}M_x)O_{1-y}(OH)_yCl_{1-x}$ particles are present between about 20.79° and about 22.79°, between about 30.03° and about 32.03°, between about 39.47° and about 41.47°, and between about 76.44° and about 78.44°.

These and other features of the nearly solvent-free combined salt electrolyte and its preparation will become apparent from the following detailed description when read in conjunction with the figures and examples, which are exemplary, not limiting.

BRIEF DESCRIPTION OF THE DRAWINGS

The present teachings will become more fully understood from the detailed description and the accompanying drawings, wherein.

It should be noted that the figures set forth herein is intended to exemplify the general characteristics of the methods, algorithms, and devices among those of the present technology, for the purpose of the description of certain aspects. The figure may not precisely reflect the characteristics of any given aspect and are not necessarily intended to define or limit specific forms or variations within the scope of this technology.

DETAILED DESCRIPTION

The present disclosure provides inorganic ionic conductors with iron oxychloride (FeOCl) doped with at least one of magnesium (Mg) and calcium (Ca). The inorganic ionic conductor has a composition of $(Fe_{1-x}M_x)O_{1-y}(OH)_yCl_{1-x}$ where M is at least one of magnesium (Mg) and calcium (Ca), x is greater than 0 and less than or equal to 0.25, and y is greater than or equal to 0 and less than or equal to 0.25. The inorganic ionic compound has a crystal structure that results in XRD peaks that are not present for undoped FeOCl and has enhanced thermal stability compared to undoped FeOCl. In addition, incorporation of the doped FeOCl in a lithium (Li)-doped solid-state electrolyte provides a solid-state electrolyte and/or positive electrode coating layer with increased ionic conductivity compared to a corresponding undoped Li solid-state electrolyte and/or positive electrode coating layer.

Figure 1:
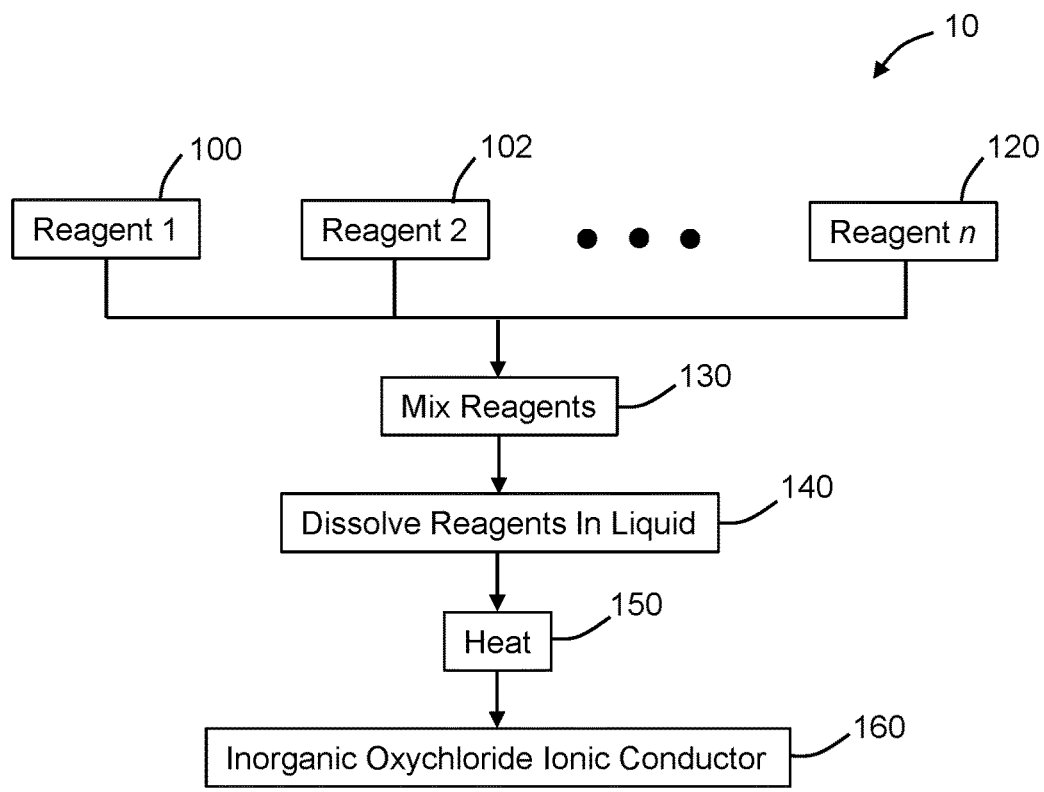
FIG. 1 shows a flow chart for a method of synthesizing an inorganic oxychloride ionic conductor according to the teachings of the present disclosure.

Referring now to FIG. 1, a flow chart of one non-limiting method 10 for synthesizing an inorganic oxychloride ionic conductor according to the teachings of the present disclosure is shown. The method 10 includes mixing two or more chloride containing reagents 100, 102, . . . 120 at 130. In some variations, the chloride containing reagents 100, 102, . . . 120 are in the form of powders that are mechanically mixed together. And in at least one variation, the chloride containing reagents 100, 102, . . . 120 include one or more chlorides of iron (Fe) mixed with one or more chlorides of Mg and/or Ca. For example, in some variations powders of $FeCl_3$, $MgCl_2$ and/or $CaCl_2$ are mechanically mixed at 130 using a mortar and pestle and/or a ball mill such that a mechanical mixture of the $FeCl_3$, $MgCl_2$ and/or $CaCl_2$ powders is formed.

The mixture of the chloride containing reagents 100, 102, . . . 120 are dissolved in a liquid to form a mixed chloride liquid solution at 140. The liquid can be any liquid in which the chloride containing reagents (e.g., $FeCl_3$, $MgCl_2$ and/or $CaCl_2$) powders dissolve, e.g., deionized water.

Heat is applied to the mixed chloride liquid solution at 150 such that an inorganic oxychloride precipitates out of the mixed chloride solution at and forms particles of the inorganic oxychloride at 160. In some variations, the mixed chloride liquid solution is heated to a temperature above 100° C., for example above 200° C. In variations where powders of one or more chlorides of Fe are mixed with powders of one or more chlorides of Mg and/or Ca, doped FeOCl in the form of $(Fe_{1-x}M_x)O_{1-y}(OH)_yCl_{1-x}$ precipitates out of the mixed chloride solution and forms particles of the $(Fe_{1-x}M_x)O_{1-y}(OH)_yCl_{1-x}$ at 160.

In some variations, the mixed chloride liquid solution is heated in a container (e.g., a glass beaker) until most or all of the liquid evaporates and precipitated particles of the inorganic oxychloride (e.g., $(Fe_{1-x}M_x)O_{1-y}(OH)_yCl_{1-x}$) remain in the container. In other variations, the mixed chloride liquid solution is poured onto a heated surface such that the liquid evaporates, and precipitated particles of the inorganic oxychloride remain on the heated surface. It should be understood that the precipitated particles of the inorganic oxychloride can be ground using a mortar and pestle and/or a ball mill to ensure uniform inorganic oxychloride particle size and/or uniform chemical composition throughout the inorganic oxychloride. In addition, the inorganic oxychloride ionic conductor can be included as or in a coating layer on a positive electrode of an electrochemical cell.

Figure 2:
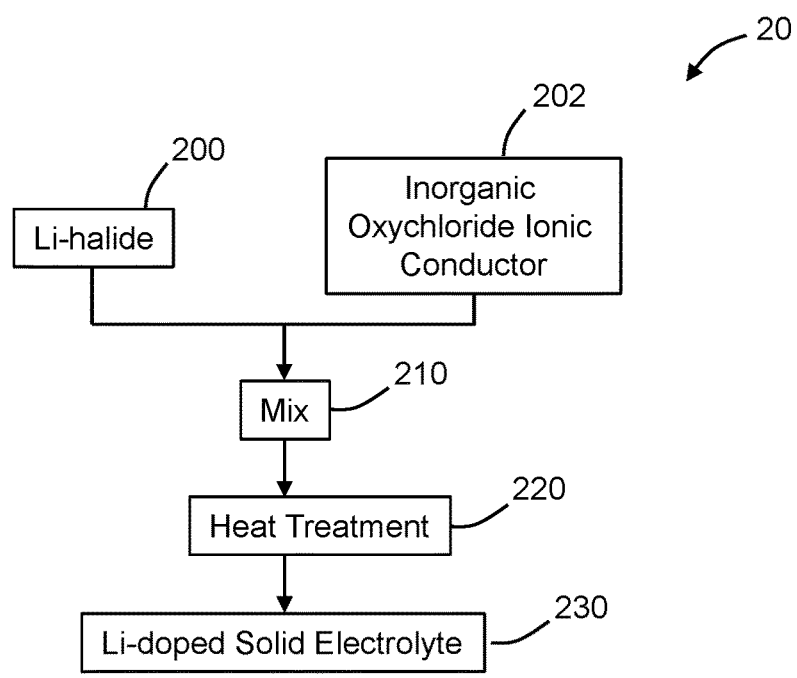
FIG. 2 shows a flow chart for a method of synthesizing a lithium doped solid electrolyte according to the teachings of the present disclosure.

Referring to FIG. 2, one non-limiting method 20 for synthesizing a Li-doped solid electrolyte is shown. The method 20 includes mixing a Li salt or Li-halide 200 with an inorganic oxychloride ionic conductor according to the teachings of the present disclosure 202 at 210. In some variations, the Li-halide is a Li-chloride, e.g., LiCl. In other variations, the Li-halide is a mixture of LiCl and a Li-fluoride, e.g., LiF. And in at least one variation the inorganic oxychloride ionic conductor is doped FeOCl in the form of $(Fe_{1-x}M_x)O_{1-y}(OH)_yCl_{1-x}$ as described above.

The mixture of the Li-halide and inorganic oxychloride ionic conductor are heat treated at 220 such that the Li-doped solid electrolyte is formed at 230. In some variations the mixture of the Li-halide and inorganic oxychloride ionic conductor are heated to temperatures above 100° C. for time periods greater than 12 hours.

In order to further describe the teachings of the present disclosure, but not limit scope thereof in any manner, one non-limiting example of synthesizing an inorganic oxychloride ionic conductor and one example of synthesizing a Li-doped solid electrolyte are provided below.

Example 1—Synthesis of Inorganic Oxychloride Ionic Conductor

Predefined portions of commercial reagent powders of $FeCl_3$, $MgCl_2$ and $CaCl_2$ were weighed in an argon (Ar) glove box with a dew point of about −90° C. The weighed portions of the $FeCl_3$, $MgCl_2$ and $CaCl_2$ powders were mixed together using a mortar and pestle and then dissolved in deionized water to form a mixed chloride liquid solution by pouring the mixed powders of $FeCl_3$, $MgCl_2$ and $CaCl_2$ into a beaker containing the deionized water, and then placing the beaker in an ultrasonic cleaner. After the mixed powders of $FeCl_3$, $MgCl_2$ and $CaCl_2$ were dissolved in the deionized water, the mixed chloride liquid solution was slowly poured into a glass beaker heated to about 200-300° C., which resulted in the evaporation of the deionized water and precipitation of dark red $(Fe_{1-x}M_x)O_{1-y}(OH)_yCl_{1-x}$ particles at the bottom of the glass beaker.

Example 2—Synthesis of Li-Doped Solid-State Electrolyte and Electrochemical Cells with the Li-Doped Solid-State Electrolyte Powder of LiCl was mixed with powder of $(Fe_{1-x}M_x)O_{1-y}(OH)_yCl_{1-x}$ formed in Example 1 and heat treated at about 230° C. for about 40 hours in an Ar atmosphere to form powders of the Li-doped solid-state electrolyte. The powders of the Li-doped solid-state electrolyte were compressed into cylindrical pellets using uni-axial pressure and the cylindrical pellets were sandwiched between electrodes in the form of 0.05 mm thick gold foil to form electrochemical cells.

Figure 3:
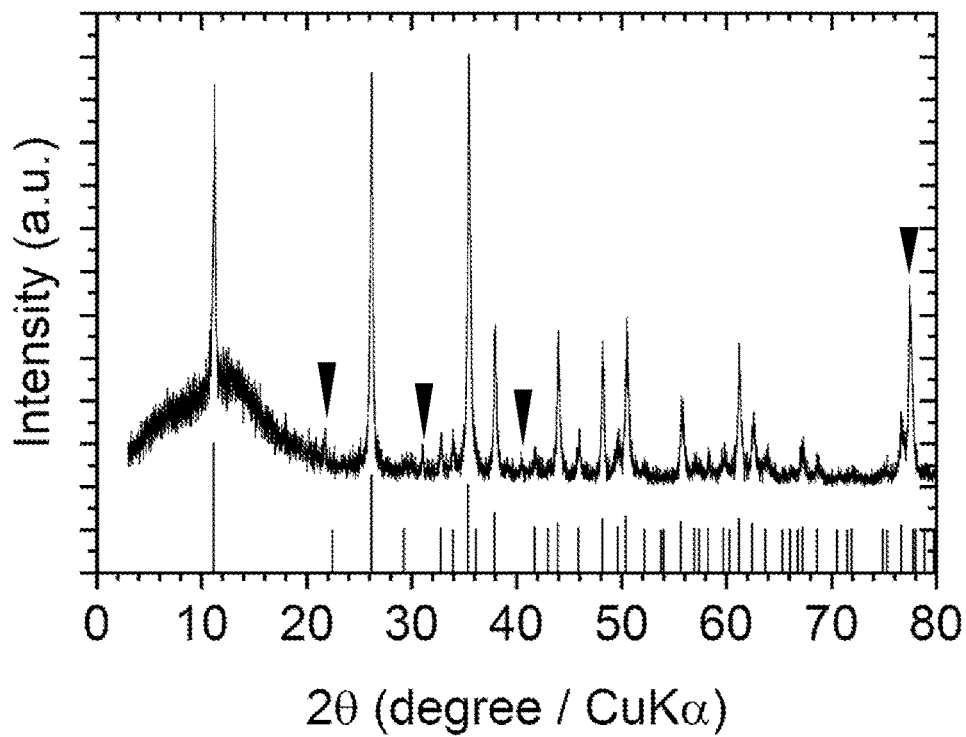
FIG. 3 is a plot of intensity versus angle 2θ for an x-ray diffraction (XRD) scan of an inorganic oxychloride ionic conductor according to the teachings of the present disclosure.

Referring to FIG. 3, a plot showing intensity versus angle $2\theta$ for an XRD scan of $(Fe_{1-x}M_x)O_{1-y}(OH)_yCl_{1-x}$ formed according to Example 1 is shown. The vertical lines extending from the x-axis represent peaks for the inorganic compound FeOCl (PDF #04-007-283) and the arrow heads in the figure point to peaks in the XRD scan that are not observed for the inorganic compound FeOCl. And as observed by the XRD scan in FIG. 3, the $(Fe_{1-x}M_x)O_{1-y}(OH)_yCl_{1-x}$ compound has a crystal structure with additional XRD peaks between about between about 20.79° and about 22.79°, between about 30.03° and about 32.03°, between about 39.47° and about 41.47°, and between about 76.44° and about 78.44°. In some variations, the additional XRD peaks represent the presence of one or more other inorganic compounds including but not limited to $FeCl_3$, $FeCl_3$ $(6H_2O)$, $Fe(OH)_3$, FeO, $Fe_2O_3$, $Fe_3O_4$, $MgCl_2$, $MgCl_2$ $(4H_2O)$, MgO, CaO, and $Ca(OH)$.

Figure 4:
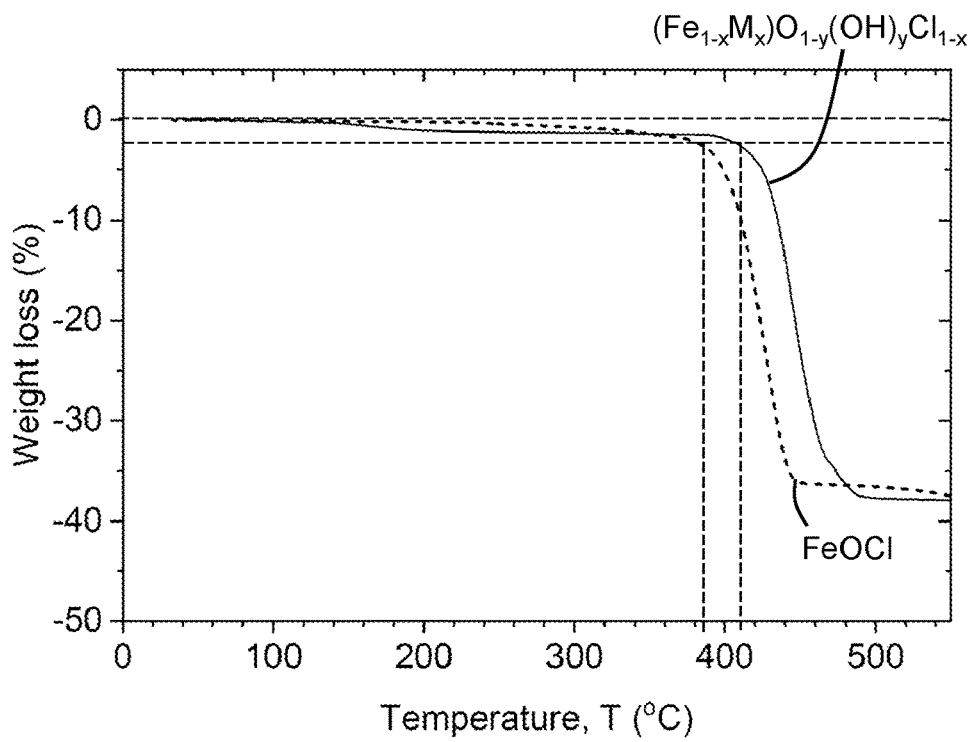
FIG. 4 is a plot of weight loss versus temperature during thermal gravimetric analysis (TGA) of undoped FeOCl and FeOCl doped according to the teachings of the present disclosure.

Referring to FIG. 4, a plot of percent weight loss versus temperature for an undoped FeOCl sample and an $(Fe_{1-x}M_x)O_{1-y}(OH)_yCl_{1-x}$ sample formed according to Example 1 above is shown. The samples were heated at a rate of about 20° C. per minute in dry air with a dew point of about −60° C. and a thermal decomposition temperature for the samples was defined as the temperature at which a sample exhibited 2.5% weight loss. And as observed from FIG. 4, the undoped FeOCl sample had a thermal decomposition temperature of about 385° C., while the $(Fe_{1-x}M_x)O_{1-y}(OH)_yCl_{1-x}$ sample had a thermal decomposition temperature of about 410° C. Accordingly, the inorganic oxychloride compound $(Fe_{1-x}M_x)O_{1-y}(OH)_yCl_{1-x}$ exhibited enhanced thermal stability compared to the undoped FeOCl with an increase in thermal decomposition temperature (i.e., thermal stability) of about 25° C.

Figure 5:
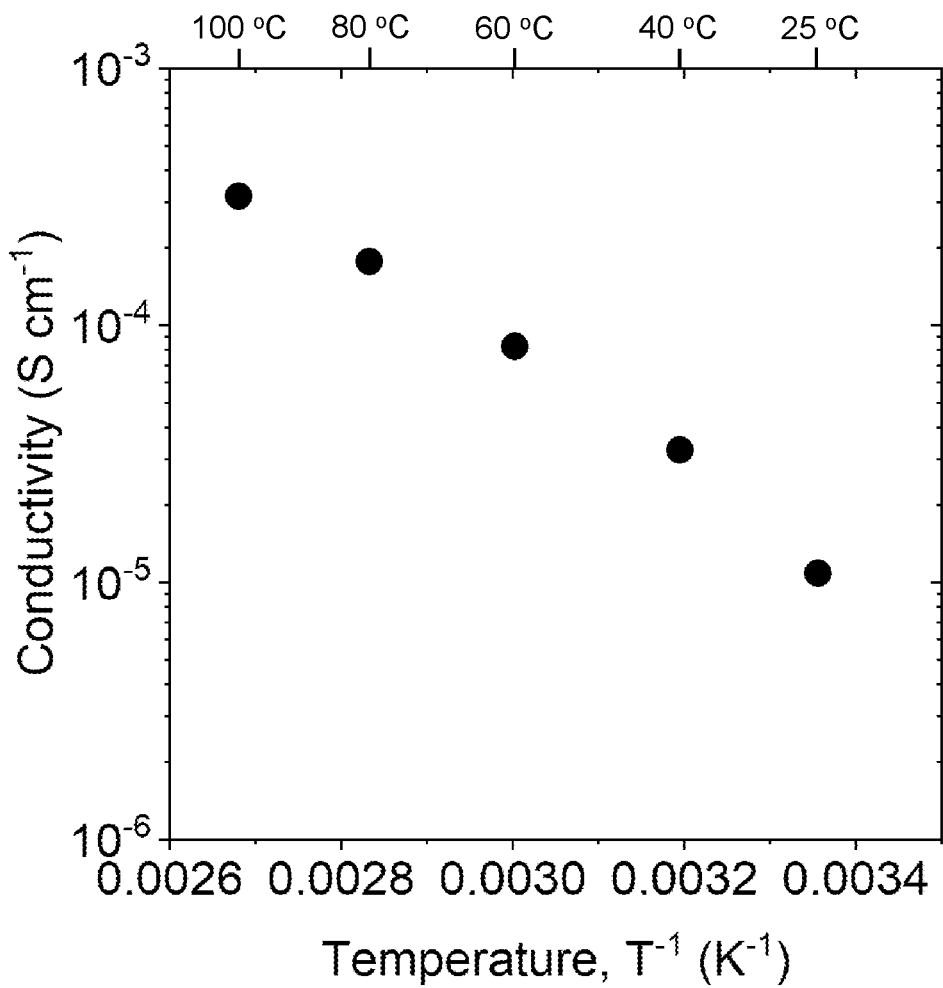
FIG. 5 is an Arrhenius plot of cationic conductivity versus temperature for a lithium doped solid-state electrolyte containing doped FeOCl according to the teachings of the present disclosure.

Referring to FIG. 5, an Arrhenius plot of cationic conductivity versus temperature for the Li-doped solid-state electrolyte formed according to Example 2 is shown. Particularly, electrochemical cells formed according to Example 2 were subjected to AC impedance testing with an applied frequency range between $10^6$ to $10^1$ Hertz using a Biologic VMP3 multichannel potentiostat/galvanostat with an impedance analyzer. And as observed in FIG. 5, the Li-doped solid-state electrolyte exhibited a cationic conductivity of about $1.0 \times 10^{-5}$ S/cm at 25° C., about $3.2 \times 10^{-5}$ S/cm at 40° C., about $8.1 \times 10^{-5}$ S/cm at 60° C., about $1.8 \times 10^{-4}$ S/cm at 80° C., and about $3.1 \times 10^{-4}$ S/cm at 100° C. In addition, reported values for the cationic conductivity for LiNbO$_3$ and Li$_3$BO$_3$ solid-state electrolytes are about $1.0 \times 10^{-6}$ S/cm. For example, the highest known conductivity of LiNbO$_3$ is $4.5 \times 10^{-6}$ S/cm at room temperature as reported or disclosed in the reference titled "Electrical and optical properties of Li-doped LiBOa and LiNb03 films" by N. Can et al, Journal of Applied Physics, 76 (1994) p. 4327-4331, and the highest known conductivity of Li$_3$BO$_3$ at 25° C. is $2 \times 10^{-6}$ S/cm as reported or disclose din the reference titled "All-solid-state lithium ion battery using garnet-type oxide and Li$_3$BO$_3$ solid electrolytes fabricated by screen-printing" by S. Ohta et al., Journal of Power Sources, 238, (2013) p. 53-56, both of which are incorporated herein by reference.

Figure 6:
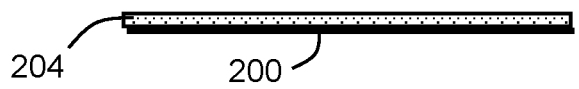
FIG. 6 shows a positive electrode coating layer containing a defect doped inorganic oxyhalide precursor according to the teachings of the present disclosure.

In view of the teachings of the present disclosure, it should be understood that a Li-doped solid-state electrolyte according to the teachings of the present disclosure exhibits enhanced cationic conductivity and/or thermal stability compared to traditional Li solid state electrolytes. In addition, in some variations a Li-doped solid-state electrolyte according to the teachings of the present disclosure is in the form of and/or part of a positive electrode coating layer 204 on a positive electrode 200 as illustrated in FIG. 6.

In some variations the Li-doped solid-state electrolyte has a cationic conductivity greater than or equal to $5.0 \times 10^{-6}$ S/cm and less than or equal to about $2.0 \times 10^{-5}$ S/cm at 25° C., greater than or equal to $2.5 \times 10^{-5}$ S/cm and less than or equal to about $4.5 \times 10^{-5}$ S/cm at 40° C., greater than or equal to $7.5 \times 10^{-5}$ S/cm and less than or equal to about $9.5 \times 10^{-5}$ S/cm at 60° C., greater than or equal to $1.0 \times 10^{-4}$ S/cm and less than or equal to about $3.0 \times 10^{-4}$ S/cm at 80° C., and/or greater than or equal to $2.5 \times 10^{-4}$ S/cm and less than or equal to about $4.5 \times 10^{-4}$ S/cm at 100° C. Accordingly, the Li-doped solid-state electrolyte containing the inorganic oxychloride ionic conductor according to the teachings of the present disclosure exhibits a cationic conductivity that is about one order of magnitude greater than traditional LiNbO$_3$ and Li$_3$BO$_3$ solid-state electrolytes.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple forms or variations having stated features is not intended to exclude other forms or variations having additional features, or other forms or variations incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/-10% of the measured value, while in other variations such known commercial and/or experimental measurement tolerances are +/-5% of the measured value, while in still other variations such known commercial and/or experimental measurement tolerances are +/-2.5% of the measured value. And in at least one variation, such known commercial and/or experimental measurement tolerances are +/-1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with a form or variation is included in at least one form or variation. The appearances of the phrase "in one variation" or "in one form" (or variations thereof) are not necessarily referring to the same form or variation. It should be also understood that the various method steps discussed herein do not have to be carried out in the same order as depicted, and not each method step is required in each form or variation.

The foregoing description of the forms or variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

While particular forms or variations have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. An ionic conductor comprising:
   an inorganic oxychloride compound comprising:
      a chemical composition of $(Fe_{1-x}M_x)O_{1-y}(OH)_yCl_{1-x}$ where M is selected from at least one of Mg and Ca, and x is greater than 0 and less than or equal to 0.25, y is greater than or equal to 0 and less than or equal to 0.25; and
      x-ray diffraction peaks with a 2θ between about 20.79° and about 22.79°, between about 30.03° and about 32.03°, between about 39.47° and about 41.47°, and between about 76.44° and about 78.44°.

2. The ionic conductor according to claim 1, wherein the inorganic oxychloride compound has a thermal decomposition start temperature of about 410° C.

3. The ionic conductor according to claim 1 further comprising a Li-doped solid-state electrolyte with the inorganic oxychloride compound.

4. The ionic conductor according to claim 3, wherein the Li-doped solid-state electrolyte comprises an ionic conductivity greater than or equal to $5.0 \times 10^{-6}$ S/cm and less than or equal to about $2.0 \times 10^{-5}$ S/cm at 25° C.

5. The ionic conductor according to claim 3, wherein the Li-doped solid-state electrolyte comprises an ionic conductivity greater than or equal to $2.5 \times 10^{-5}$ S/cm and less than or equal to about $4.5 \times 10^{-5}$ S/cm at 40° C.

6. The ionic conductor according to claim 3, wherein the Li-doped solid-state electrolyte comprises an ionic conductivity greater than or equal to $7.5 \times 10^{-5}$ S/cm and less than or equal to about $9.5 \times 10^{-5}$ S/cm at 60° C.

7. The ionic conductor according to claim 3, wherein the Li-doped solid-state electrolyte comprises an ionic conductivity greater than or equal to $1.0 \times 10^{-4}$ S/cm and less than or equal to about $3.0 \times 10^{-4}$ S/cm at 80° C.

8. The ionic conductor according to claim 3, wherein the Li-doped solid-state electrolyte comprises an ionic conductivity greater than or equal to $2.5 \times 10^{-4}$ S/cm and less than or equal to about $4.5 \times 10^{-4}$ S/cm at 100° C.

9. The ionic conductor according to claim 1, wherein the inorganic oxychloride compound further comprises at least one of $FeCl_3$, $FeCl_3(6H_2O)$, $Fe(OH)_3$, FeO, $Fe_2O_3$, $Fe_3O_4$, $MgCl_2$, $MgCl_2(4H_2O)$, MgO, CaO, and Ca(OH).

10. The ionic conductor according to claim 1 further comprising a positive electrode with a coating layer comprising the inorganic oxychloride compound.

11. An ionic conductor comprising:
an inorganic oxychloride compound comprising:
a chemical composition of $(Fe_{1-x}M_x)O_{1-y}(OH)_yCl_{1-x}$ and where M is selected from at least one of Mg and Ca, and x is greater than 0 and less than or equal to 0.25, y is greater than or equal to 0 and less than or equal to 0.25;
x-ray diffraction peaks with a 2θ between about 20.79° and about 22.79°, between about 30.03° and about 32.03°, between about 39.47° and about 41.47°, and between about 76.44° and about 78.44°; and
a thermal decomposition start temperature of about 410° C.

12. The ionic conductor according to claim 11, wherein the inorganic oxychloride compound further comprises at least one of $FeCl_3$, $FeCl_3(6H_2O)$, $Fe(OH)_3$, FeO, $Fe_2O_3$, $Fe_3O_4$, $MgCl_2$, $MgCl_2(4H_2O)$, MgO, CaO, and Ca(OH).

13. A method comprising:
mixing together two or more chloride containing reagents;
dissolving the mixed two or more chloride containing reagents in a liquid; and
heating the liquid with the dissolved two or more chloride containing reagents such that an inorganic oxychloride compound precipitates and forms particles of $(Fe_{1-x}M_x)O_{1-y}(OH)_yCl_{1-x}$ where M is selected from at least one of Mg and Ca, and x is greater than 0 and less than or equal to 0.25, y is greater than or equal to 0 and less than or equal to 0.2, and x-ray diffraction peaks of the $(Fe_{1-x}M_x)O_{1-y}(OH)_yCl_{1-x}$ particles include a 2θ between about 20.79° and about 22.79°, between about 30.03° and about 32.03°, between about 39.47° and about 41.47°, and between about 76.44° and about 78.44°.

14. The method according to claim 13, wherein the two or more chloride containing reagents include $FeCl_3$ and at least one of $MgCl_2$ and $CaCl_2$.

15. The method according to claim 14, wherein the liquid is water.

16. The method according to claim 15, wherein the water with the dissolved two or more chloride containing reagents is heated to a temperature above 100° C.

17. The method according to claim 16 further comprising mixing the particles of $(Fe_{1-x}M_x)O_{1-y}(OH)_yCl_{1-x}$ with a Li salt and forming a Li-doped solid-state electrolyte.

18. The method according to claim 17, wherein the Li salt is LiCl.

19. The method according to claim 18, wherein the Li-doped solid-state electrolyte comprises an ionic conductivity greater than or equal to $5.0 \times 10^{-6}$ S/cm and less than or equal to about $2.0 \times 10^{-5}$ S/cm at 25° C.

20. The method according to claim 13, wherein the inorganic oxychloride compound further comprises at least one of $FeCl_3$, $FeCl_3(6H_2O)$, $Fe(OH)_3$, FeO, $Fe_2O_3$, $Fe_3O_4$, $MgCl_2$, $MgCl_2(4H_2O)$, MgO, CaO, and Ca(OH).

* * * * *